United States Patent
Rachepalli et al.

(10) Patent No.: US 7,286,532 B1
(45) Date of Patent: Oct. 23, 2007

(54) HIGH PERFORMANCE INTERFACE LOGIC ARCHITECTURE OF AN INTERMEDIATE NETWORK NODE

(75) Inventors: Maruthingendra P. Rachepalli, Sunnyvale, CA (US); Ramesh Sivakolundu, Saratoga, CA (US); Kenneth H. Potter, Raleigh, NC (US); Guy C. Fedorkow, Bedford, MA (US); Gary S. Muntz, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 1248 days.

(21) Appl. No.: 09/791,063

(22) Filed: Feb. 22, 2001

(51) Int. Cl.
*H04L 12/28* (2006.01)
(52) U.S. Cl. .................. 370/391; 370/389; 370/420
(58) Field of Classification Search ............. 370/230, 370/232, 233, 234, 235, 231, 351, 352, 353, 370/389, 391, 392, 395.31, 412, 354, 356, 370/359, 386, 400, 401, 404, 229, 388, 395.21, 370/395.42
See application file for complete search history.

(56) References Cited

U.S. PATENT DOCUMENTS

| | | | |
|---|---|---|---|
| 4,756,606 A | | 7/1988 | Jewell et al. |
| 5,790,546 A | * | 8/1998 | Dobbins et al. ............ 370/400 |
| 5,991,817 A | | 11/1999 | Rowett et al. |
| 6,061,348 A | | 5/2000 | Castrigno et al. |
| 6,115,374 A | | 9/2000 | Stonebridge et al. |
| 6,163,543 A | | 12/2000 | Chin et al. |
| 6,370,145 B1 | * | 4/2002 | Dally et al. ................ 370/400 |
| 6,400,681 B1 | * | 6/2002 | Bertin et al. ................ 370/218 |
| 6,424,659 B2 | * | 7/2002 | Viswanadham et al. .... 370/469 |
| 6,487,170 B1 | * | 11/2002 | Chen et al. ................. 370/231 |
| 6,553,031 B1 | * | 4/2003 | Nakamura et al. .......... 370/392 |
| 6,587,463 B1 | * | 7/2003 | Hebb et al. ................. 370/392 |
| 6,647,428 B1 | * | 11/2003 | Bannai et al. .............. 709/245 |
| 6,658,021 B1 | * | 12/2003 | Bromley et al. ............ 370/466 |
| 6,665,301 B1 | * | 12/2003 | Wu ....................... 370/395.41 |
| 6,879,559 B1 | * | 4/2005 | Blackmon et al. .......... 370/225 |
| 6,907,001 B1 | * | 6/2005 | Nakayama et al. ......... 370/230 |
| 6,934,256 B1 | * | 8/2005 | Jacobson et al. ........... 370/235 |
| 6,954,463 B1 | * | 10/2005 | Ma et al. .................... 370/401 |
| 7,031,320 B2 | * | 4/2006 | Choe ...................... 370/395.31 |
| 7,039,720 B2 | * | 5/2006 | Alfieri et al. ........... 370/395.31 |
| 2002/0016856 A1 | * | 2/2002 | Tallegas et al. ............. 709/238 |
| 2002/0103921 A1 | * | 8/2002 | Nair et al. .................. 709/232 |
| 2002/0118682 A1 | * | 8/2002 | Choe ...................... 370/395.31 |
| 2005/0058128 A1 | * | 3/2005 | Carson et al. .............. 370/388 |

OTHER PUBLICATIONS

U.S. Appl. No. 09/791,074, K. Potter et al.
U.S. Appl. No. 09/790,968, W. Brandt et al.
Cisco 7200 and NPE Hardware Overview, Cisco Systems, Inc. 1999; pp. 1-35.
U.S. Appl. No. 09/791,062, filed Feb. 22, 2001, Muntz.

* cited by examiner

*Primary Examiner*—Phirin Sam
(74) *Attorney, Agent, or Firm*—Cesari and McKenna LLP (57) ABSTRACT

An aggregation router architecture comprises a plurality of line cards coupled to at least one performance routing engine (PRE) via an interconnect system. The line cards include input cards having input ports coupled to subscribers and at least one trunk card configured to aggregate packets received from the subscriber inputs over at least one output port. The PRE performs packet forwarding and routing operations, along with quality of service functions for the packets received from each input line card over the interconnect system. The interconnect system comprises a plurality of high-speed unidirectional (i.e., point-to-point) links coupling the PRE to each line card. The point-to-point links couple the line cards to a novel logic circuit of the PRE that is configured to interface the line cards to a packet buffer and a forwarding engine of the PRE.

42 Claims, 6 Drawing Sheets

HIGH PERFORMANCE INTERFACE LOGIC ARCHITECTURE OF AN INTERMEDIATE NETWORK NODE

CROSS-REFERENCE TO RELATED APPLICATIONS

The present invention is related to the following co-pending and commonly assigned U.S. patent applications:

U.S. patent application Ser. No. 09/791,074 titled, Method and Apparatus for Controlling Packet Header Buffer Wrap Around in a Forwarding Engine of an Intermediate Network Node; and U.S. patent application Ser. No. 09/790,968 titled, Mapping Technique for Computing Addresses in a Memory of an Intermediate Network Node, each of which was filed on even date herewith and incorporated by reference as though fully set forth herein.

FIELD OF THE INVENTION

The present invention relates to communications networks and, in particular, to the architecture of an aggregation router used in a communications network, such as a computer network.

BACKGROUND OF THE INVENTION

A computer network is a geographically distributed collection of interconnected communication links and segments for transporting data between nodes, such as computers. Many types of network segments are available, with the types ranging from local area networks (LAN) to wide area networks (WAN). For example, the LAN may typically connect personal computers and workstations over dedicated, private communications links, whereas the WAN may connect large numbers of nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols. In this context, a protocol consists of a set of rules defining how the nodes interact with each other.

Computer networks may be further interconnected by an intermediate node or device, such as a switch or router, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connection to the Internet. To interconnect private networks that are geographically diverse, an organization may subscribe to one or more ISPs and couple each of its private networks to the ISP's equipment. Here, the router may be utilized to interconnect a plurality of private networks or subscribers to an IP "backbone" network. Routers typically operate at the network layer of a communications protocol stack, such as the internetwork layer of the Transmission Control Protocol/Internet Protocol (TCP/IP) communications architecture.

Simple networks may be constructed using general-purpose routers interconnected by links owned or leased by ISPs. As networks become more complex with greater numbers of elements, additional structure may be required.

In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to Internet backbones and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. The aggregation router, or "aggregator", is an access router configured to provide high quality of service (QoS) and guaranteed bandwidth for both data and voice traffic destined for the Internet. The aggregator also provides a high degree of security for such traffic. These functions are considered "high-touch" features that necessitate substantial processing of the traffic by the router.

More notably, the aggregator is configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

In addition to deployment at a POP, the aggregator may be deployed in a telephone company central office. The large numbers of subscribers connected to input interface ports of the aggregator are typically small to medium sized businesses that conduct a substantial portion of their operations "on-line", e.g., over the Internet. Each of these subscribers may connect to the aggregator over a high reliability link connection that is typically leased from, e.g., a telephone company provider. The subscriber traffic received at the input interfaces is funneled onto at least one trunk interface. That is, the aggregator essentially functions as a large "fan-in" device wherein a plurality (e.g., thousands) of relatively low-speed subscriber input links is aggregated onto a single, high-speed output trunk to a backbone network of the Internet.

Broadly stated, each input link may comprise a T1 or T3 connection, whereas the output trunk interface connection may comprise an OC-12 connection. A T1 connection has a data rate of 1.5 megabits per seconds (Mbps) and there are preferably 28 T1s to each T3 connection; a T3 connection thus has an effective data rate of approximately 42 Mbps. On the other hand, the effective data rate of an OC-12 trunk interface connection is typically 622 Mbps. As noted, the aggregator receives a plurality of subscriber inputs (e.g., 1000 T1 lines) and aggregates them onto a single output trunk (e.g., an OC-12 link). However, not all T1 links are constantly in use and, through the use of statistical multiplexing, the number of input subscriber lines that can be disposed over a single output trunk at one time can be determined. For example, although the effective data input rate of 1000 T1 lines is greater than 1 gigabit per second (Gbps), the subset of T1 lines that is constantly in use (e.g., approximately 400 T1 lines) may be supported over a single 622 Mbps link (OC-12).

Examples of intermediate network device platforms that may be used as aggregation routers include the 7200 Series and 12000 Series systems available from Cisco Systems, Inc. The Cisco 7200 system embodies a centralized network processing engine architecture that utilizes a shared bus as its switching fabric. The Cisco 12000 gigabit switch router (GSR) system, on the other hand, is based on a high-speed distributed routing architecture that utilizes a crossbar switch fabric having point-to-point links as its switching core. The present invention is directed, in part, to an aggregation router having a centralized routing architecture coupled to a point-to-point switch fabric for servicing a plurality of subscriber input links.

As noted, floor space is a precious commodity within the telecommunications industry and, in particular, within an ISP. As a result, the industry typically employs conventional "channelization" techniques to address this issue. That is, a "front end" subsystem may be used to multiplex (aggregate) a plurality of telephone calls (e.g., 24×28 DS0 links) over a single high-capacity (e.g., T3) output link by periodically sampling the calls and placing them over the output link. The T3 link (and other similar links) is then provided as an input to the aggregator. The architecture of the novel aggregation router described herein is adapted to aggregate a plurality of high-capacity, e.g., T3, links onto a higher-capacity, e.g., OC-12, output link. The present invention is further directed to an aggregation router architecture that occupies a relatively small footprint.

SUMMARY OF THE INVENTION

The present invention relates to an aggregation router architecture comprising a plurality of line cards coupled to at least one performance routing engine (PRE) via an interconnect system. The line cards include input cards having input ports coupled to subscribers and at least one trunk card configured to aggregate packets received from the subscriber inputs over at least one output port. The PRE performs packet forwarding and routing operations, along with quality of service (QoS) functions for the packets received from each input line card over the interconnect system. To that end, the interconnect system comprises a plurality of high-speed unidirectional (i.e., point-to-point) links coupling the PRE to each line card.

Specifically, the point-to-point links couple the line cards to a novel backplane logic circuit of the PRE that is configured to interface the line cards to a packet buffer and a forwarding engine of the PRE. The point-to-point links facilitate scaling within the aggregator in terms of speed per line card, while also limiting the number of pins needed to interface to the plurality of line cards. The packet buffer is configured to store packets as the forwarding engine renders forwarding and QoS decisions to determine where and when the packets should be forwarded within the aggregator.

In accordance with an aspect of the present invention, the novel backplane interface logic is preferably embodied as a high-performance, application specific integrated circuit (ASIC). The backplane interface logic comprises a plurality of high-bandwidth functional circuits including an interconnect interface section for coupling to the line cards, a packet memory interface section for coupling with the packet buffer and a forwarding engine interface section for coupling with the forwarding engine. The interface ASIC also includes an internal packet memory (IPM) for temporarily storing payloads of packets as their headers are processed by the forwarding engine and a plurality of DMA engines that control the movement of data to and from the line cards, packet buffer and forwarding engine.

A notable feature of the present invention is the ability to "terminate" all of the line card connections along one side of the interface ASIC. That is, only one quarter of the ASIC perimeter is needed to interface to the line cards. By providing all high-bandwidth interface functions within the ASIC, the wiring needed to interconnect those functions becomes practical, primarily because the wires on the ASIC are minute, as opposed to larger wires needed to otherwise connect multiple semiconductor "chips". In the absence of a single ASIC implementation of the interface logic, the efficiency of packet processing functions by the PRE would be hindered. In addition, construction of a central aggregation point within the aggregator, such as the PRE, would be quite expensive.

In accordance with another aspect of the present invention, each of the connections between the functional circuit blocks is a high-bandwidth connection configured to carry data in the range of, e.g., gigabits per second. These high-bandwidth connections may advantageously be realized because the functional circuits are implemented on a single ASIC. An attempt to "slice" the circuitry among multiple chips would result in an unwieldy arrangement, primarily because of the difficulty in constructing such high-bandwidth connections discretely on, e.g., a printed circuit board. Moreover, there is no "good" way to slice the functional circuits among multiple chips and still achieve the high-bandwidth necessary to meet the QoS requirements of the aggregator.

Architectural features of the aggregation router include implemention of a conventional multi-level switching arrangement within a single router and the ability of the PRE to support and accommodate substantially large bandwidth requirements. In the illustrative embodiment, the aggregation router can support up to 3000 subscribers, each of which may comprise a DS0, a fractional T1, a T1, a fractional T3 or a T3 connection. Moreover, by implementing a multi-level switching arrangement within a single router, congestion management and latency may be improved, both of which improve the QoS delivery of the device.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
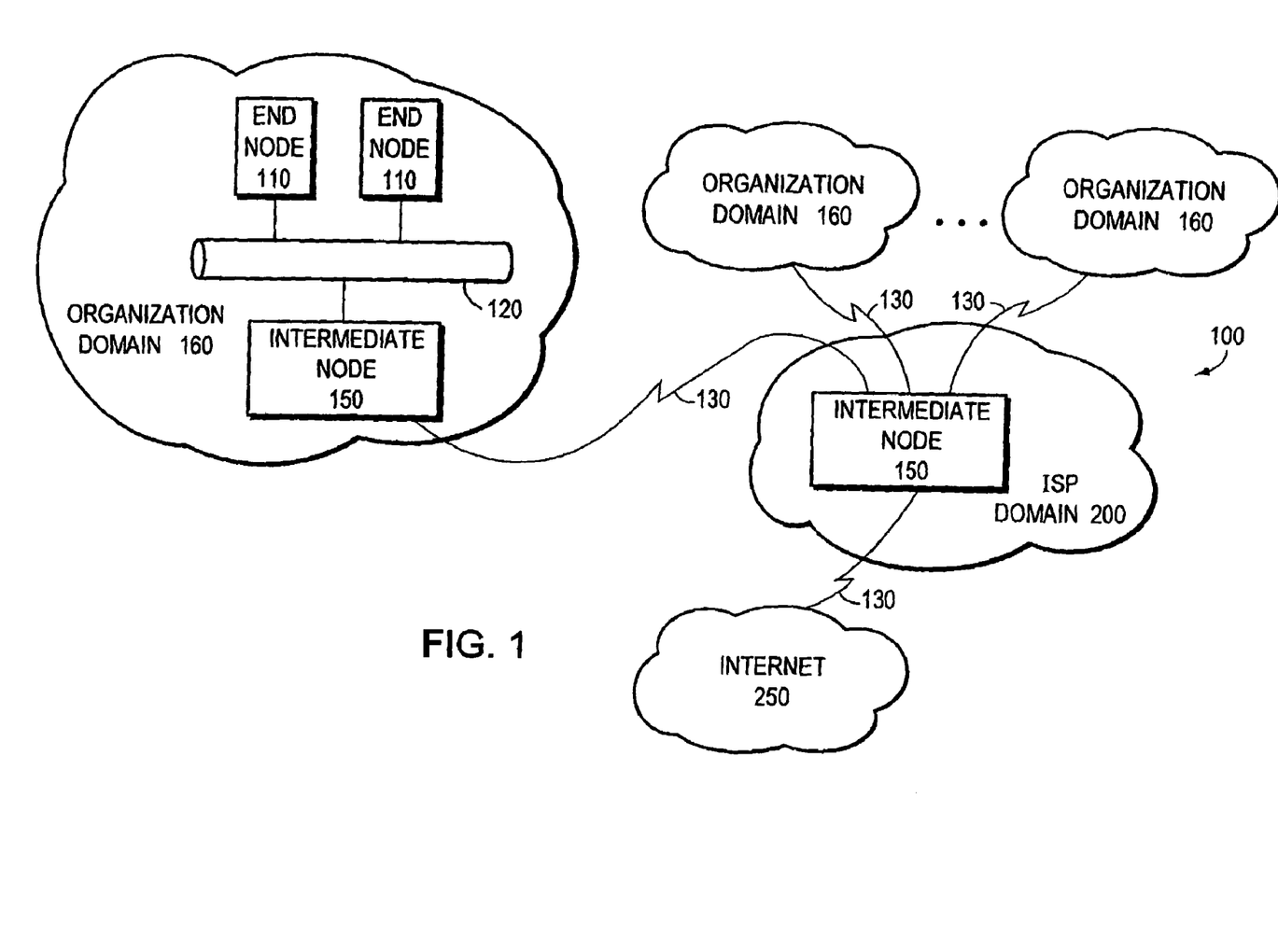
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP). It should be noted that other techniques/protocols, such as the Hypertext Transfer Protocol (HTTP), may be advantageously used with the present invention.

Figure 2:
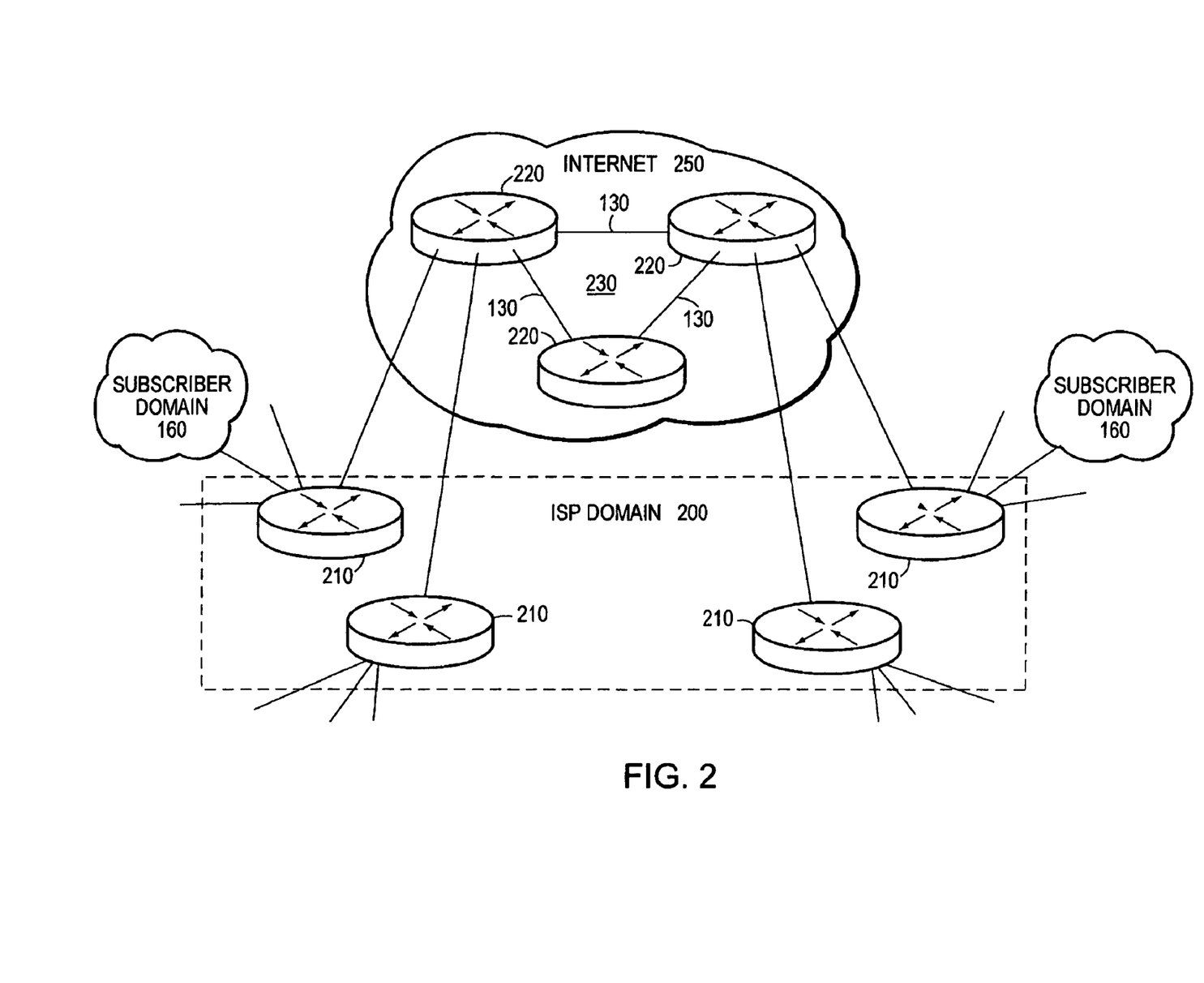
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide area connectivity to the Internet, represented herein as Internet cloud 250.

Figure 3:
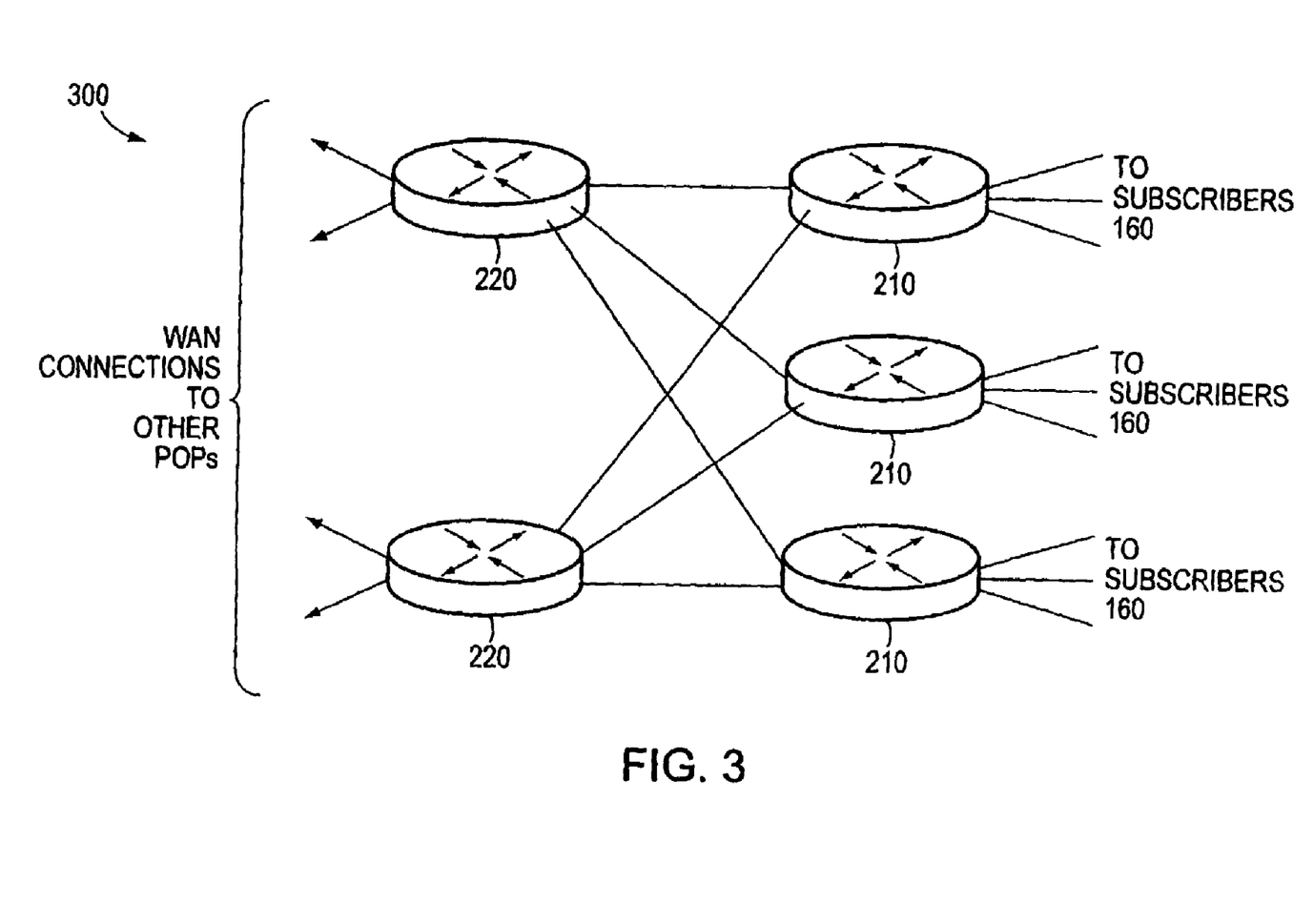
FIG. 3 is a schematic block diagram of an illustrative embodiment of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
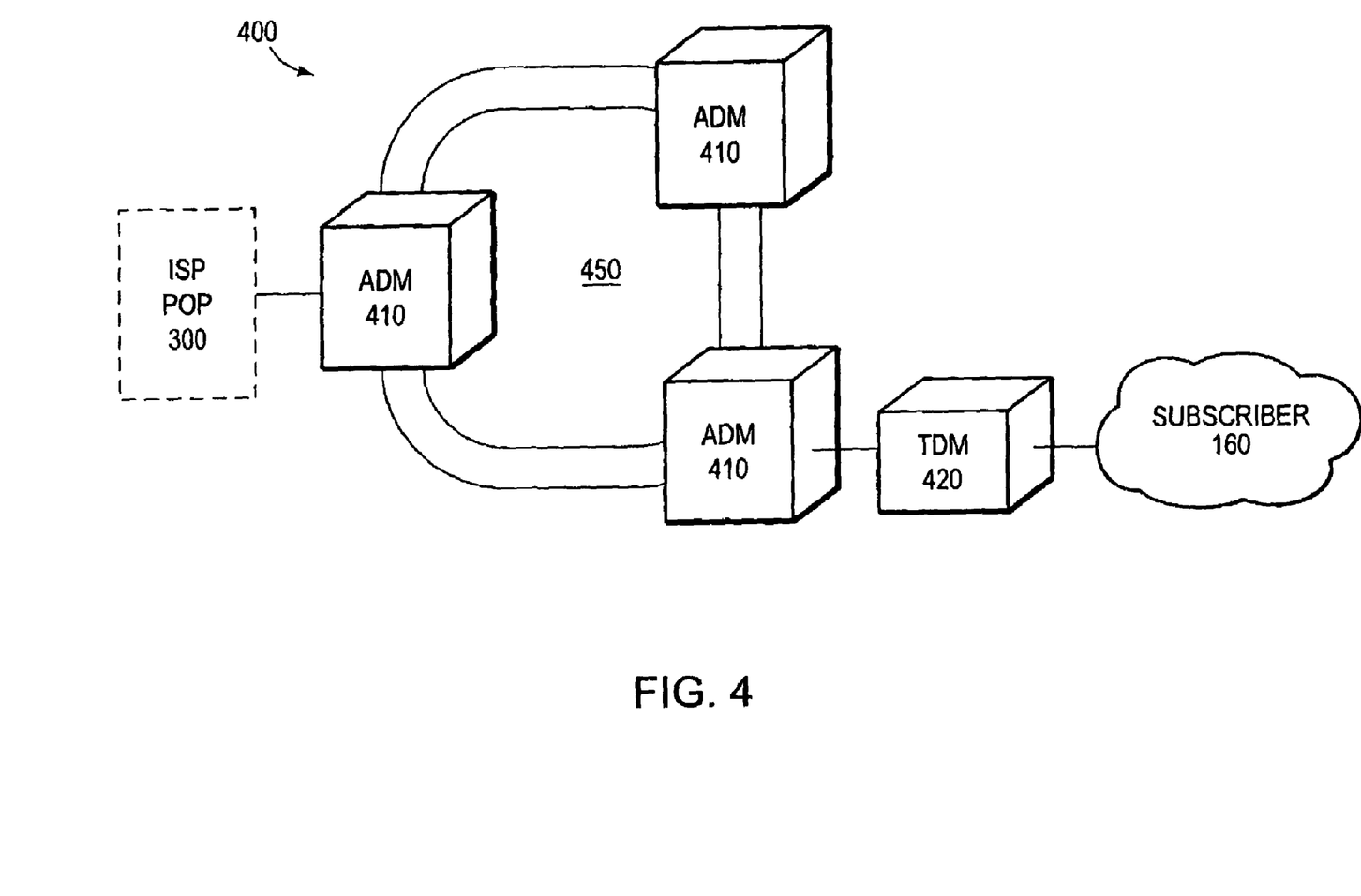
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DS1 and 44.736-Mbps DS3 signals from a subscriber site 160 across a fiber-optic ring 450 to an ISP POP 300. To that end, the SONET network 400 comprises a TDM device 420 configured to multiplex a plurality of (e.g., 28) DS1 circuits to fill a DS3 circuit. In addition, the network 400 comprises a plurality of add drop multiplexers (ADMs 410) configured to "drop-off" either DS1 or DS3 circuits onto, e.g., an OC-48 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
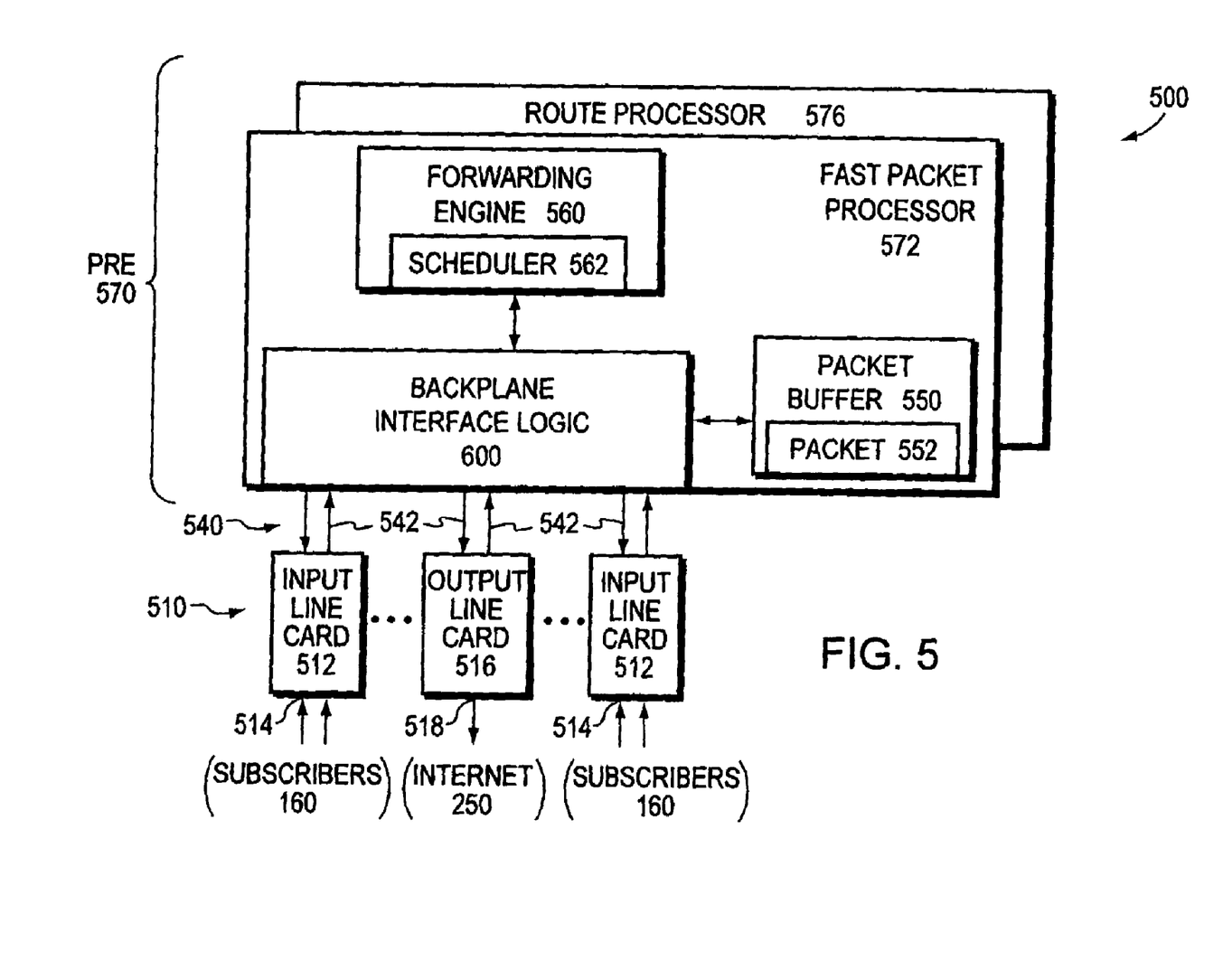
FIG. 5 is a schematic block diagram of an aggregation router in accordance with the present invention.

FIG. 5 is a schematic block diagram of an aggregation router 500 in accordance with the present invention. The aggregation router ("aggregator") comprises a plurality of line cards 510 coupled to at least one performance routing engine (PRE 570) via a unidirectional (i.e., point-to-point) interconnect system 540. The line cards 510 include a plurality of input cards 512 having input ports 514 coupled to subscribers 160 and at least one output "trunk" card 516 configured to aggregate the subscriber inputs over at least one output port 518. The PRE 570 performs packet forwarding and routing operations, along with quality of service (QoS) functions for complete packets received from each input line card over the interconnect system. To that end, the interconnect system 540 comprises a plurality of high-speed unidirectional links 542 coupling the PRE to each line card 510. In the illustrative embodiment, the links are preferably clock forwarded links such that each unidirectional link comprises two data wires for transporting the data signals and one clock wire for carrying clock signals. However, it will be understood to those skilled in the art that the clock forwarding technique may scale to accommodate other clock forwarding arrangements such as, e.g., four data wires for each accompanying clock wire.

In the illustrative embodiment, the aggregator 500 includes sixteen (16) line cards 510, each of which is configured for an OC-12 (622 Mbps) data rate. Thus, the point-to-point links 542 coupled to the line cards must be capable of supporting such data rates. Accordingly, an interconnect protocol is provided that enables encoding of packets over the point-to-point links of the interconnect system to thereby limit the bandwidth consumed by overhead when transmitting the packets within the aggregation router. An example of an interconnect protocol that may be advantageously used with the present invention is disclosed in copending and commonly-owned U.S. patent application Ser. No. 09/791,062 titled High Performance Protocol for an Interconnect System of an Intermediate Network Node, which application is hereby incorporated by reference as though fully set forth herein.

The point-to-point links 542 are used to couple the line cards to a novel backplane logic circuit 600 of the PRE that is configured to interface the line cards to a packet buffer 550 and a forwarding engine 560 of the PRE. The point-to-point links 542 facilitate scaling within the aggregator in terms of speed per line card, while also limiting the number of pins needed to interface to the plurality of line cards. The packet buffer 550 is a memory used to store packets as the forwarding engine 560 determines where and when they should be forwarded within the aggregator. For example, the packet buffer may be used to store low priority data packets while high priority, low latency voice packets are forwarded by the forwarding engine to an output card (e.g., the trunk card 516) of the aggregator.

An architectural feature of the aggregator is the ability of the PRE 570 to support and accommodate substantially large bandwidth requirements. Sixteen OC-12 links generate a significant amount of traffic, e.g., an effective data rate of 10 Gbps, flowing both into and out of the aggregator. A single wire coupled to a typical printed circuit board (PCB) is generally limited to a data rate of approximately 100 Mbps. In order to accommodate an effective data rate of 10 Gbps through the aggregator, 100 input wires and 100 output wires would be needed to interface with the PCB. The PCB would thus function as a central aggregation point, similar to the PRE, and 200 wires, each operating at 100 Mbps, would constitute an excessive amount of traffic for the PCB.

Figure 6:
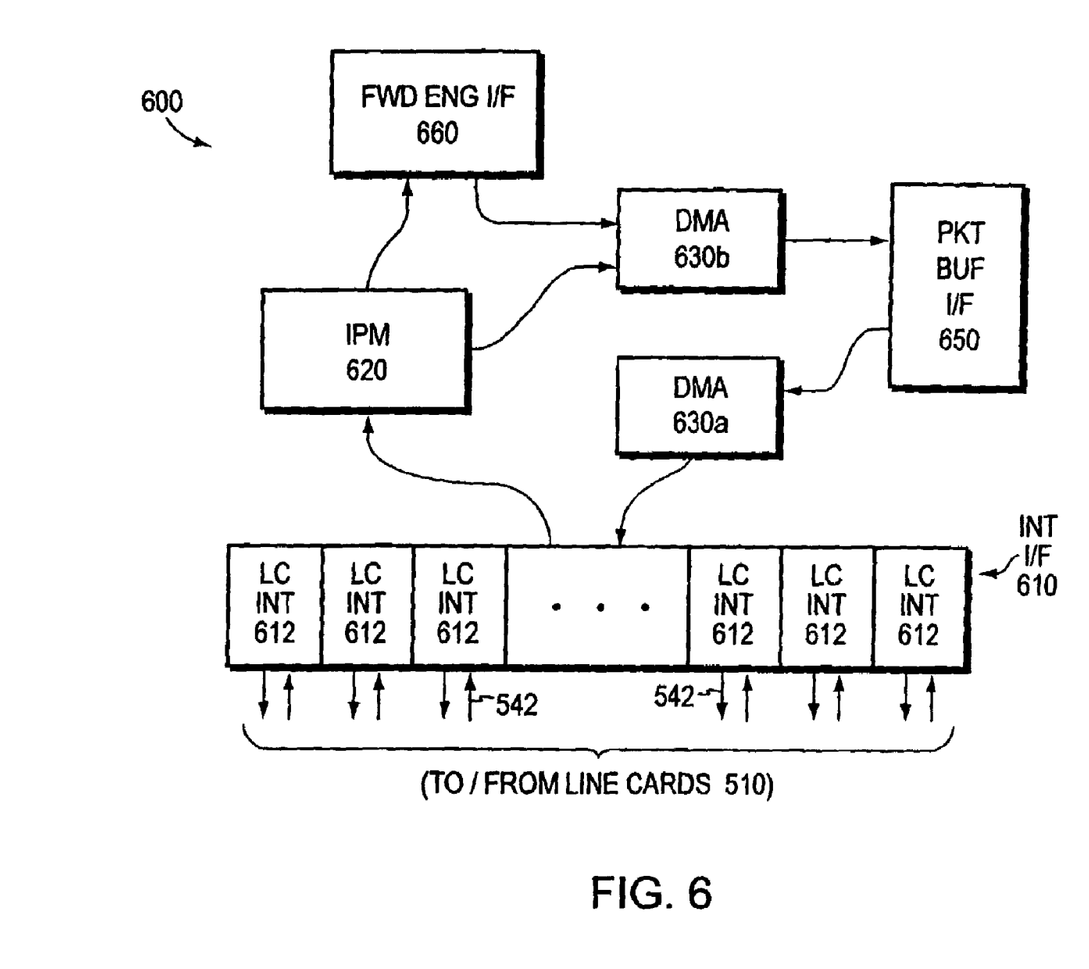
FIG. 6 is a functional block diagram of interface logic circuitry contained on an application specific integrated circuit of the aggregation router in accordance with the present invention.

Specifically, the backplane interface logic 600 on the PRE must support effective data rates of 20 Gbps to/from the line cards 510, 20 Gbps to/from the packet buffer 550 and 10 Gbps to/from the forwarding engine 560. The total bandwidth requirement of the interface logic circuitry 600 within the aggregator is thus approximately 50 Gbps. An attempt to split (slice) this logic among multiple integrated circuit "chips" on, e.g., the line card(s) would result in an "explosion" of wires because a finite number of pins are required for each function of the logic. Moreover, there is no "good" way to interconnect such high-bandwidth functional chips. Accordingly, it is not feasible to slice the functions of the interface logic 600 of the aggregator into multiple chips.

In accordance with an aspect of the present invention, the novel backplane interface logic 600 is preferably embodied as a high-performance, application specific integrated circuit (ASIC), hereinafter referred to as the Cobalt ASIC. The Cobalt ASIC 600 includes read/write interface circuitry for connecting to the packet buffer 550, the forwarding engine 560 and the line cards 510. A notable aspect of the present invention is the ability to "terminate" all of the line card connections along one side of the Cobalt ASIC 600. That is, only one quarter of the ASIC perimeter is needed to interface to the line cards. By providing all high-bandwidth interface functions within the Cobalt ASIC, the wiring needed to interconnect those functions becomes practical, primarily because the wires on the ASIC 600 are minute, as opposed to larger wires needed to connect chips. In the absence of a single-chip implementation of the interface logic, the efficiency of packet processing functions by the PRE would be hindered. In addition, construction of a central aggregation point within the aggregator, such as the PRE, would be quite expensive.

In the illustrative embodiment, the Cobalt ASIC 600, the packet buffer 550 and forwarding engine 560 are contained on a "fast packet" processor module 572 of the PRE 570. The fast packet processor 572 is configured to perform forwarding decisions for the aggregation router. The forwarding engine 560 is preferably embodied as a plurality of processing elements symmetrically arrayed as four (4) rows and eight (8) columns in a 4×8 processing engine arrayed configuration. However, it will be understood to those skilled in the art that other arrayed configurations, such as an 8×2 or 8×8 array, may be used in accordance with the present invention.

The PRE 570 also includes a separate route processor module 576 having a general-purpose processor configured to execute a network operating system, such as the Internetworking Operating System (IOS®) available from Cisco Systems Inc., along with constructing and loading routing tables used by the fast packet processor 572. The route processor 576 performs all the configuration management functions of the aggregator 500 and communicates with neighboring peer routers to exchange protocol data units used to construct the routing tables in accordance with conventional routing algorithms. The fast packet and route processors are preferably interconnected in a "mezzanine" arrangement to form the PRE 570.

Operationally, a packet 552 is initially received at an input port 514 of a line card 512 and, after minimal buffering, is sent over a point-to-point link 542 to the Cobalt ASIC 600 where it is parsed into a header and data "payload". The packet payload is stored in an internal packet memory (IPM) of the Cobalt ASIC 600, while the header is passed to the forwarding engine 560. The forwarding engine cooperates with a scheduler 562 of the aggregator to process the header by, e.g., updating it in accordance with a forwarding decision and determining when the packet should be delivered to an output port 518 of the aggregator 500. Broadly stated, the scheduler 562 manages a queuing function that, e.g., prioritizes voice packets over data packets and essentially implements high-touch QoS features of the aggregator. After rendering the forwarding and/or QoS decisions, the forwarding engine 560 returns the updated header to the Cobalt ASIC 600 where it is merged with its payload and stored again as a packet 552 in the packet buffer 550.

Packets 552 generally reside in the packet buffer 550 while awaiting forwarding in accordance with QoS decisions. The packet buffer can also be used to store packets while alleviating congestion in the system. Thus in addition to delivering the updated header to the Cobalt ASIC, the forwarding engine 560 also provides control information specifying the QoS features applied to the particular packet. Based on that control information, the Cobalt ASIC 600 subsequently retrieves the packet 552 from the packet buffer and forwards it over a point-to-point link 542 to an output trunk card 516 for delivery over an output port 518 to, e.g., the Internet 250. Consequently, a packet 552 passes through the Cobalt backplane interface logic 600 twice while undergoing transformations during its flow through the PRE 570, once again illustrating the need for a high-bandwidth ASIC implementation of that interface circuitry.

FIG. 6 is a functional block diagram of the backplane interface logic 600 contained on the Cobalt ASIC in accordance with the present invention. The novel interface logic circuitry comprises a plurality of high-bandwidth functional circuits including an inter-connect interface (Int I/F) section 610 comprising a plurality of (e.g., 16) line card interface circuits (LC Int 612). Each LC Int 612 comprises small, low risk and low power transceiver circuitry coupled a line card 510 over a point-to-point link 542 of the interconnect system 540. The Cobalt ASIC 600 also includes a packet buffer interface (Pkt Buf I/F) section 650 comprising read/write circuitry configured to interface with the packet buffer 550, and a forwarding engine interface (Fwd Eng I/F) section 660 comprising read/write circuitry for interfacing with the forwarding engine 560.

As noted, the backplane interface logic 600 also includes the IPM 620 for temporarily storing the payloads of packets while their headers are processed by the forwarding engine 560 and a plurality of direct memory access (DMA) logic controllers (i.e., engines) 630 that control the movement of data to and from the line cards 510, packet buffer 550 and forwarding engine 560. As for the latter functional circuits, the forwarding engine 560 generates a series of commands to the DMA engines 630 to enable merging of processed headers with their payloads and transferring of data to and from the packet buffer 550. Here, a first DMA engine 630a facilitates data transfers from the Pkt Buf I/F 650 to the LC Int 612. A second DMA engine 630b facilitates merging of an updated (new) header from the Fwd Eng I/F 660 with its corresponding payload retrieved from the IPM 620 for delivery to the Pkt Buf I/F 650.

In accordance with another aspect of the present invention, each of the connections between the functional circuit blocks is a high-bandwidth connection configured to carry data in the range of, e.g., gigabits per second. These high-bandwidth connections may advantageously be realized because the functional circuits are implemented on a single ASIC. An attempt to "slice" the circuitry among multiple semiconductor chips would result in an unwieldy arrangement, primarily because of the difficulty in constructing such high-bandwidth connections discretely on, e.g., a PCB. Moreover, there is no "good" way to slice the functional circuits among multiple chips and still achieve the high-bandwidth necessary to meet the QoS requirements of the aggregator.

For example, each LC Int 612 is designed to be relatively small and efficient to enable placement of sixteen (16) copies of its circuitry within one functional Int I/F section 610 on one side of the Cobalt ASIC. This feature of the invention allows a large majority of the internal footprint of the ASIC 600 to be used for the other functional circuitry. Each LC Int 612 incorporates the signal, electrical and mechanical characteristics, and interchange circuits, needed to interface with the physical media (point-to-point link 542) and protocols running over that media. In an embodiment of the aggregation router 500, each line card is linked to a primary PRE via a plurality of primary, clock forwarded unidirectional links, while a plurality of second, clock forwarded unidirectional links connect each line card to a redundant PRE.

Specifically, electrical signaling in the LC Ints 612 of the interconnect system utilizes a low voltage differential signaling (LVDS) standard. This protocol combines advantages of differential signaling with easy integration into the Cobalt ASIC. Differential signaling is typically used to carry fast electrical signals that are highly resistant to electrical noise, permitting lower amplitude voltage swings and tolerating transitions through multiple circuit boards and connectors to thereby minimize electromagnetic interference. Differential reception doubles the effective edge rate while eliminating errors in threshold voltage, such that transition times are fast and predictable.

The interconnect system 540 of the aggregator 500 allows insertion of all line cards 510 within connector slots of a backplane (not shown) to connect to the single Cobalt ASIC 600 on the PRE 570, while delivering sustained OC-12 bandwidth per slot. Since the interconnect system 540 uses a clock forwarding scheme, an explicit clock signal is sent along with each unidirectional "bundle" of data signals. The LC Int 612 at each end of the unidirectional link preferably has access to a common clock frequency, but not to a precise phase. A receiver in each LC Int uses the explicit clock signal to indicate the phase of the data bundle and to "clock" (recover) data bits from that bundle. This high precision timing arrangement permits short bit intervals and, therefore, a low wire count. By activating more data wires, the aggregation router 500 may efficiently scale to attain OC-48 bandwidth per full slot. In the illustrative embodiment, each data wire may carry 400 Mbps.

In the illustrative embodiment, each LC Int 612 contains one clock and two data transceiver circuits. That is, the clock forwarding arrangement comprises one clock signal wire for every bundle of two data signal wires. This arrangement may be scaled to include one clock signal wire for every bundle of four data signal wires or two clock signal wires for every bundle of eight data signal wires (i.e., bound mode). As noted, the Int I/F circuitry 610 only occupies one edge of the Cobalt ASIC 600, as opposed to an entire quarter of that ASIC. Therefore, the interface circuitry is designed as efficiently (in terms of footprint conservation) as possible.

Clock forwarding enables disposition of more transceivers on a single ASIC as opposed to embedded clock recovery even though clock forwarding utilizes more wires. The clock forwarding transceiver circuitry utilizes simple drivers and receivers to enable high integration of these components within each LC Int 612 of the Cobalt ASIC. This is primarily because the interconnect system is fully contained within the aggregator chassis. In many embedded clock recovery applications, the transceivers are interconnected by relatively long spans of cables (fiber optic) that extend outside of the enclosures containing those transceivers, e.g., over a telephone line. Thus, the clock forwarding transceiver circuitry does not require as much "fault tolerance" as the embedded clock recovery circuitry. The transmitter portion of the transceiver logic is generally simple in that it is constantly running and utilizes the framing control information within the data stream to determine the beginning of frames within the stream. However, the receiver circuits are more complicated because the timing of the received data stream is unknown due to the varying lengths of the links coupling the transmitters and receivers, and due to process variations of other ASICs (containing transmitters) coupled to the receivers.

Essentially, each receiver on the Cobalt ASIC is configured to identify a new framing pattern within a received data stream, extract the framed data from the data stream using a clock signal forwarded with the data and synchronize with internal circuitry within the ASIC. The receiver must also be capable of identifying and isolating any faulty data transmitted over the point-to-point link 542 of the interconnect system 540. Isolation in this context denotes preventing propagation of "bad" data throughout the internal circuitry of the Cobalt ASIC 600. The term "bad" data may refer to errors within the data stream that cannot be corrected using error correction techniques (such as cyclic redundancy checks), along with data constituting packets having lengths that are not supported within the Cobalt ASIC (either to small or to large).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A high-performance interface logic circuit of an intermediate network node having a processor, a memory and a plurality of line cards having input/output ports, the interface logic circuit comprising:
    a plurality of high-bandwidth functional circuits configured to interface the input/output ports to the memory and processor of the intermediate network node, the high-bandwidth functional circuits embodied as a single application specific integrated circuit (ASIC), the functional circuits having an interconnect interface section for coupling to the input ports and output ports, a memory interface section for coupling to the memory, and a processor interface section for coupling to the processor.

2. The high-performance interface logic circuit of claim 1 wherein the high-bandwidth functional circuits further comprise an internal packet memory for temporarily storing payloads of packets received at the input ports as their headers are processed by the processor and a plurality of direct memory access engines that control movement of data to and from the input/output ports, memory and processor.

3. The high-performance interface logic circuit of claim 2 wherein the intermediate network node is a router of a communications network.

4. The high-performance interface logic circuit of claim 3 wherein the router is an aggregation router.

5. The high-performance interface logic circuit of claim 3 wherein the input/output ports are contained on line cards, each of which is coupled to the interface logic circuit over unidirectional links of the router.

6. The high-performance interface logic circuit of claim 5 wherein the processor is a forwarding engine configured to perform forwarding and quality of service (QoS) functions for packets received from each input port over the unidirectional links.

7. The high-performance interface logic circuit of claim 6 wherein the memory is a packet buffer configured to store the packets as the forwarding engine renders forwarding and QoS decisions to determine where and when the packets should be forwarded within the router.

8. An aggregation router comprising:
    an interconnect system having a plurality of high-speed unidirectional links;
    a plurality of line cards including input cards having input ports coupled to subscribers and at least one trunk card configured to aggregate packets received from the subscriber input ports over at least one output port;
    a performance routing engine (PRE) coupled to the line cards via the unidirectional links, the PRE performing packet forwarding and routing operations, along with quality of service functions for the packets received from each input port over the unidirectional links; and
    a high-performance logic circuit coupled to the PRE comprising a plurality of high-bandwidth functional circuits configured to interface the line cards to a packet buffer and a forwarding engine of the PRE.

9. The aggregation router of claim 8 wherein the high-bandwidth functional circuits comprise an interconnect interface section for coupling to the line cards, a packet memory interface section for coupling with the packet buffer and a forwarding engine interface section for coupling with the forwarding engine.

10. The aggregation router of claim 9 wherein the high-bandwidth functional circuits comprise an internal packet memory for temporarily storing payloads of packets as their headers are processed by the forwarding engine and a plurality of direct memory access engines that control movement of data to and from the line cards, the packet buffer and the forwarding engine.

11. The aggregation router of claim 8 wherein the high-bandwidth functional circuits of the logic circuit are embodied as an application specific integrated circuit.

12. A method for interfacing input/output ports of a plurality of line cards of a router with a processor and a memory of the router, the method comprising the steps of:
    providing a plurality of high-bandwidth functional circuits configured to interface the input/output ports to the memory and processor; and
    embodying the high-bandwidth functional circuits as a single application specific integrated circuit (ASIC), the functional circuits having an interconnect interface section for coupling to the input ports and output ports, a memory interface section for coupling to the memory, a processor interface section for coupling to the processor.

13. The method of claim 12 wherein the step of providing comprises the step of coupling the input/output ports to the ASIC with an interconnect interface section of the high-bandwidth functional circuits.

14. The method of claim 12 wherein the step of providing comprises the step of coupling the memory to the ASIC with a memory interface section of the high-bandwidth functional circuits.

15. The method of claim 12 wherein the step of providing comprises the step of coupling the processor to the ASIC with a processor interface section of the high-bandwidth functional circuits.

16. The method of claim 12 wherein the step of providing comprises the step of temporarily storing payloads of packets received at the input ports at an internal packet memory of the high-bandwidth functional circuits.

17. The method of claim 12 wherein the step of providing comprises the step of controlling movement of data to and from the input/output ports, memory and processor using a plurality of direct memory access engines of the high-bandwidth functional circuits.

18. The method of claim 12 further comprising the steps of:
    embodying the input/output ports on line cards of the router; and
    coupling each line card to the ASIC over unidirectional links of the router.

19. The method of claim 18 further comprising the step of performing forwarding and quality of service functions for packets received from each input port over the unidirectional links.

20. Apparatus for interfacing input/output ports of a plurality of line cards of a router with a processor and a memory of the router, the apparatus comprising:
- means for providing a plurality of high-bandwidth functional circuits configured to interface the input/output ports to the memory and processor; and
- means for embodying the high-bandwidth functional circuits as a single application specific integrated circuit (ASIC), the functional circuits having an interconnect interface section for coupling to the input ports and output ports, a memory interface section for coupling to the memory, a processor interface section for coupling to the processor.

21. The apparatus of claim 20 wherein the means for providing comprises means for coupling the input/output ports to the ASIC, the means for coupling embodied as an interconnect interface section of the high-bandwidth functional circuits.

22. The apparatus of claim 20 wherein the means for providing comprises means for coupling the memory to the ASIC, the means for coupling embodied as a memory interface section of the high-bandwidth functional circuits.

23. The apparatus of claim 20 wherein the means for providing comprises means for coupling the processor to the ASIC, the means for coupling embodied as a processor interface section of the high-bandwidth functional circuits.

24. The apparatus of claim 20 wherein the means for providing comprises means for temporarily storing payloads of packets received at the input ports.

25. The apparatus of claim 24 wherein the means for temporarily storing comprises an internal packet memory of the high-bandwidth functional circuits.

26. The apparatus of claim 20 wherein the means for providing comprises means for controlling movement of data to and from the input/output ports, memory and processor.

27. The apparatus of claim 26 wherein the means for controlling comprises a plurality of direct memory access engines of the high-bandwidth functional circuits.

28. A router, comprising:
- a plurality of line cards, the line cards providing both input ports and output ports;
- a processor;
- a memory; and
- logic circuits to interface the plurality of line cards with the memory and with the processor, the logic circuits providing a high bandwidth data path for movement of packets received/transmitted by the plurality of line cards to/from the memory and to/from the processor, the logic circuits having an interconnect interface section for coupling to the input ports and output ports, a memory interface section for coupling to the memory, a processor interface section for coupling to the processor, and the logic circuits embodied as a single integrated circuit.

29. The router as in claim 28, further comprising:
the logic circuits are implemented in a single application specific integrated circuit (ASIC).

30. A method for operating a router, comprising:
- providing both input ports and output ports by at least one line card of a plurality of line cards;
- interfacing the plurality of line cards with a memory and with a processor by logic circuits, the logic circuits providing a high bandwidth data path for movement of packets received/transmitted by the plurality of line cards to/from the memory and to/from the processor, the logic circuits having an interconnect interface section for coupling to the input ports and output ports, a memory interface section for coupling to the memory, a processor interface section for coupling to the processor, and the logic circuits embodied as a single integrated circuit.

31. The method as in claim 30, further comprising:
implementing the logic circuits in a single application specific integrated circuit (ASIC).

32. A router, comprising:
- means for providing both input ports and output ports by at least one line card of a plurality of line cards;
- means for interfacing the plurality of line cards with a memory and with a processor by logic circuits, the logic circuits providing a high bandwidth data path for movement of packets received/transmitted by the plurality of line cards to/from the memory and to/from the processor, the logic circuits having an interconnect interface section for coupling to the input ports and output ports, a memory interface section for coupling to the memory, a processor interface section for coupling to the processor, and the logic circuits embodied as a single integrated circuit.

33. The method as in claim 32, further comprising:
means for implementing the logic circuits in a single application specific integrated circuit (ASIC).

34. The high-performance interface logic circuit of claim 1 further comprising:
a receiver, wherein the receiver is configured to i) identify a new framing pattern within a received data stream, ii) extract the framed data from the data stream using a clock signal, and iii) synchronize with internal circuitry within the ASIC.

35. The router of claim 28 wherein the interconnect interface section is configured to send unidirectional data signals and to send an explicit clock signal along with the unidirectional data signals.

36. The router of claim 28 wherein the processor is configured to perform forwarding decisions.

37. The router of claim 28 wherein the processor is a fast packet processor.

38. The router of claim 28 wherein the router is an aggregation router.

39. The router of claim 28 wherein the logic circuits further comprise:
- an internal packet memory to temporarily store payloads of packets received at the input ports as their headers are processed by the processor; and
- a plurality of direct memory access engines that control movement of data to and from the input/output ports, memory and processor.

40. The router of claim 28 further comprising:
individual links adapted to couple the input/output ports to the logic circuits.

41. The router of claim 28 wherein the processor is a forwarding engine configured to perform forwarding and quality of service (QoS) functions for packets received from each input port.

42. The router of claim 41 wherein the memory is a packet buffer configured to store the packets as the forwarding engine renders forwarding and QoS decisions to determine where and when the packets should be forwarded within the router.

* * * * *

UNITED STATES PATENT AND TRADEMARK OFFICE
CERTIFICATE OF CORRECTION

PATENT NO. : 7,286,532 B1 Page 1 of 1
APPLICATION NO. : 09/791063
DATED : October 23, 2007
INVENTOR(S) : Rachepalli et al.

It is certified that error appears in the above-identified patent and that said Letters Patent is hereby corrected as shown below:

On the Title Pg Item (75), "Maruthingendra" should be --Maruthinagendra--.

Signed and Sealed this

Twenty-fifth Day of May, 2010

David J. Kappos
*Director of the United States Patent and Trademark Office*